United States Patent
Guillaume et al.

(10) Patent No.: US 9,115,847 B2
(45) Date of Patent: Aug. 25, 2015

(54) AUTONOMOUS LUBRICATOR WITH OPTICAL SIGNALING

(75) Inventors: Sébastien Guillaume, Gruffy (FR); Hervé Lenon, Gruffy (FR); Gérard Mermoud, La Balme de Sillingy (FR); Christophe Oddoux, Annecy le Vieux (FR)

(73) Assignee: NTN—SNR ROULEMENTS, Annecy (FR)

( * ) Notice: Subject to any disclaimer, the term of this patent is extended or adjusted under 35 U.S.C. 154(b) by 831 days.

(21) Appl. No.: 13/281,027

(22) Filed: Oct. 25, 2011

(65) Prior Publication Data

US 2012/0132484 A1    May 31, 2012

(30) Foreign Application Priority Data

Oct. 26, 2010  (FR) ...................................... 10 04208

(51) Int. Cl.
| | |
|---|---|
| *F01M 1/18* | (2006.01) |
| *F01M 1/00* | (2006.01) |
| *F01M 11/10* | (2006.01) |
| *F16N 11/08* | (2006.01) |

(52) U.S. Cl.
CPC ...................... *F16N 11/08* (2013.01)

(58) Field of Classification Search
CPC ..... F16N 11/08; F16N 29/04; F16N 2230/19; F16N 2260/12
USPC ........................ 184/6.4, 7.4, 37, 39
See application file for complete search history.

(56) References Cited

U.S. PATENT DOCUMENTS

| | | | | |
|---|---|---|---|---|
| 5,271,528 | A * | 12/1993 | Chien | 222/63 |
| 5,404,966 | A * | 4/1995 | Yang | 184/39 |
| 5,971,229 | A * | 10/1999 | May et al. | 222/390 |
| 6,167,318 | A * | 12/2000 | Kizer et al. | 700/83 |
| 6,216,822 | B1 * | 4/2001 | May et al. | 184/105.1 |
| 8,783,418 | B2 * | 7/2014 | Orlitzky et al. | 184/37 |

FOREIGN PATENT DOCUMENTS

| | | |
|---|---|---|
| EP | 0 616 921 A2 | 9/1994 |
| FR | 2 697 073 A3 | 4/1994 |

\* cited by examiner

*Primary Examiner* — William E Dondero
*Assistant Examiner* — Mark K Buse
(74) *Attorney, Agent, or Firm* — Arent Fox LLP

(57) ABSTRACT

A lubricator comprises a container of variable volume holding a lubricant and having an opening for dispensing the lubricant. An electromechanical or electrochemical actuator operated by a control circuit makes it possible to reduce the volume of the container. An electrical circuit for displaying the state of the lubricator comprising a light source can emit at least one alarm light signal. A lid affixed to the container in a removable manner constitutes a housing for the electrical signal display circuit and defines a reference axis of the lubricator. A light diffuser guides the light emitted by the light source towards numerous light outlets distributed along the circumference of the lid in a manner that at least one of the light outlets is visible regardless of the position of an observer facing the lubricator and is located on a circle of observation centered on the reference axis of the lubricator.

24 Claims, 16 Drawing Sheets

Figure 3:
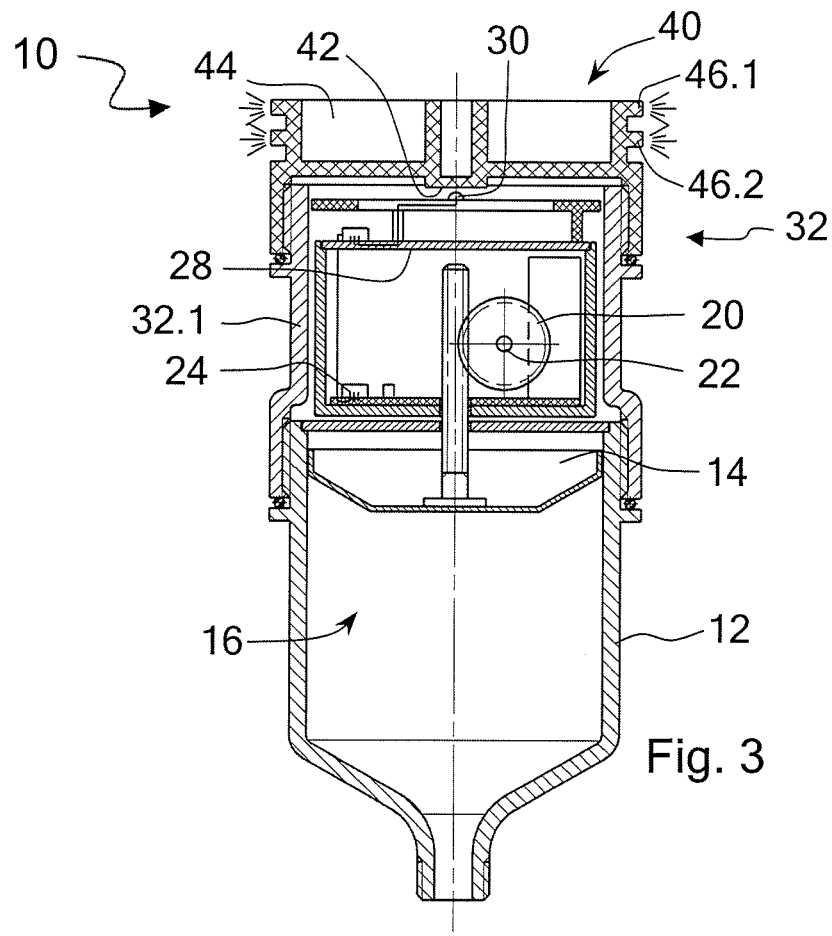

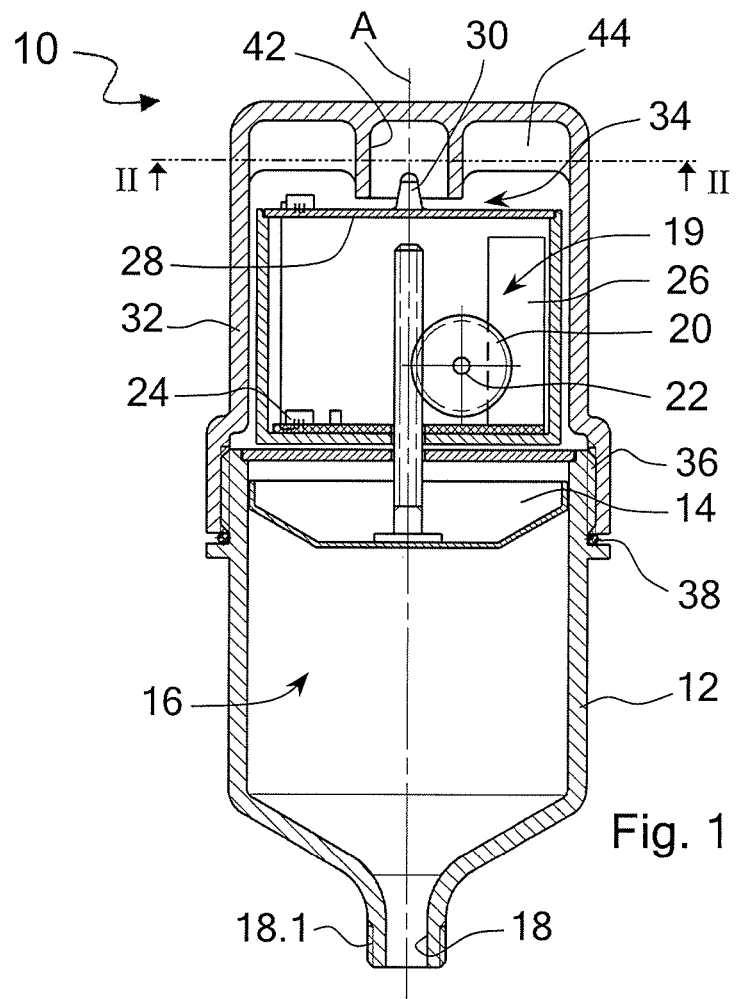
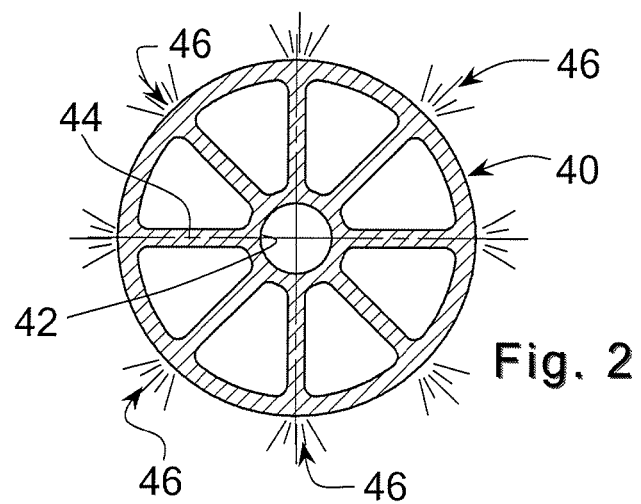

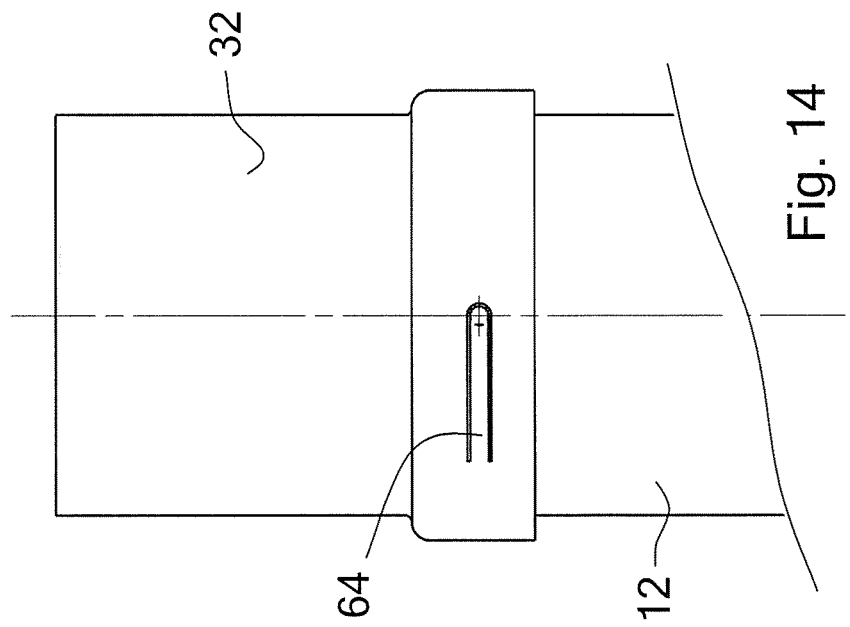
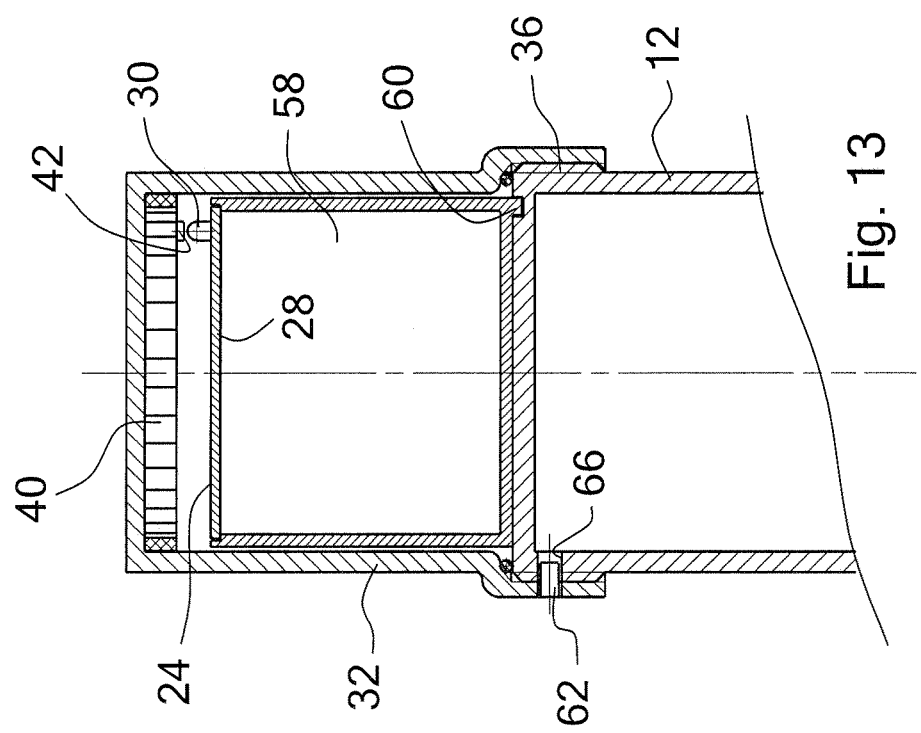

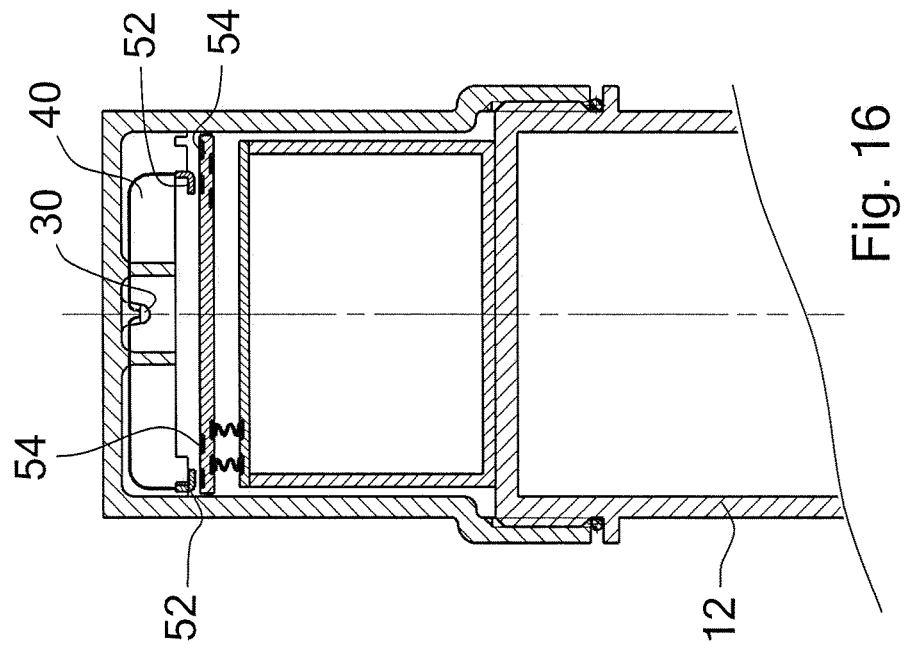
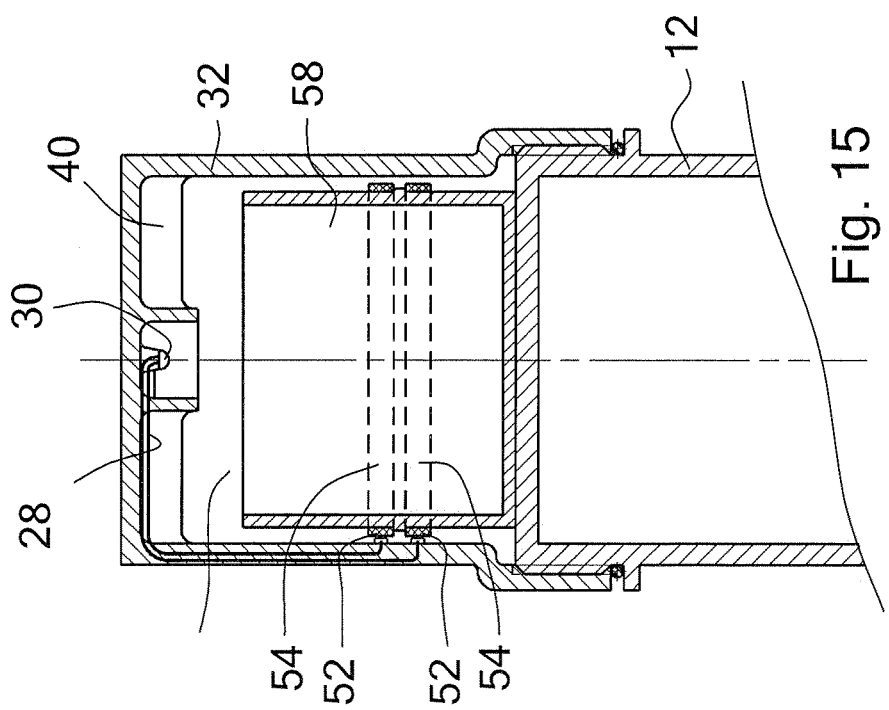

AUTONOMOUS LUBRICATOR WITH OPTICAL SIGNALING

TECHNICAL FIELD OF THE INVENTION

The invention relates to a lubricator, i.e. a lubrication system for a machine part, such as for example a roller bearing or a plain bearing, in particular an autonomous lubricator equipped with an electromechanical actuator, which makes it possible for the machine part to be supplied with lubricant either by means of a lubrication program stored in local memory or via a remote control, i.e., without manual intervention.

STATE OF THE ART

Such lubricators are usually located in production shops or machine shops, wherever machine parts must be lubricated, often in not very accessible places. These lubricators are controlled by on-board or remote control programs whether hard-wired or not. They are generally equipped with light displays which indicate their state, for example by emitting light flashes or continuous light signals that indicate the state of the lubricator (for example: correct operation, defect, end of operation).

It has been found that the existing signal display devices are not necessarily visible over a wide field of vision, which is all the more problematic if the lubricator is located high up or at a distance from the access paths of service personnel.

DESCRIPTION OF THE INVENTION

The invention is intended to remedy the disadvantages of the state of the art and in particular to provide a lubricator equipped with an improved visual display device in a simple and reliable manner.

To this end, the object of the invention is a lubricator comprising:
- a container having a variable volume for holding a lubricant, the container being equipped with at least one opening for dispensing the lubricant;
- an actuator, in particular an electromechanical or electrochemical actuator, to reduce the volume of the container;
- an electrical control circuit for the electromechanical actuator;
- an electrical circuit for indicating of the state of the lubricator, comprising a light source so as to emit at least one alarm light signal,
- a lid affixed to the container in a detachable manner so as to constitute a housing for the electrical display circuit, with the lid defining a geometric reference axis of the lubricator, and
- a light diffuser to guide the light emitted by the light source towards numerous distributed light outlets on the circumference of the lid such that at least one of the light outlets is visible regardless of the position of an observer facing the lubricator and is located on a circle of observation centered on the reference axis of the lubricator.

In practice, the lid provides access to one or more components of the lubricator, and in particular to the electrical display or control circuits, to the electromechanical actuator, to an autonomous source of electrochemical energy, such as a battery or an electrical accumulator, and/or to the container holding the lubricant.

The number of light outlets can be arbitrary, as long as it is compatible with a detection of the light for 360° around the reference axis. In practice, the number of light outlets will be greater than three.

The reference axis of the lid, which above all defines in which directions the light emitted by the light source must radiate, can, if necessary, also be an axis for assembling the lid with respect to the container. It can also constitute a symmetry axis of the lid, with the latter possibly having a generally cylindrical shape.

The light diffuser preferably comprises a light inlet directed toward the light source and at least one light guide for distributing the light to the light outlets.

The light guide imposes a trajectory on the light, a part of which can be a circular arc around the reference axis, for example so as to guide the light towards the various light outlets on the periphery of the lid.

The trajectory of the light in the light guide can also be at least partially radial with respect to the reference axis.

In one mode of assembly, the lid is screwed onto the container along the reference axis.

The diffuser can be placed inside the lid, with the lid being transparent, at least at the level of the light outlets. The lid then protects the diffuser from dust and any other extraneous pollution.

According to one mode of assembly, the electrical control circuit comprises a printed control circuit board, with the electrical display circuit comprising a printed circuit board for displaying a signal which is distinct from the printed control circuit board, and which is connected to the printed control circuit board via at least one electrical connection interface comprising an electrical connector that is connected directly with the electrical display circuit, and a corresponding electrical connector connected directly to the electrical control circuit.

It can then be anticipated that at least one of the electrical connectors will have a contact strip forming a circular arc around the reference axis, which allows the electrical display circuit to be assembled with respect to the electrical control circuit via a rotational movement around the reference axis and makes it possible to obtain a good connection, even in the event of imprecise positioning of the two circuits with respect to each other. This can be particularly useful when the electrical display circuit is integrated into the lid and if the latter is screwed onto the actuator.

At least one of the connectors should preferably be elastically deformable.

In one mode of assembly, the electrical display circuit is attached to the lid. Alternatively, the electrical display circuit can be assembled on a board that is placed in the lid and is indexed by rotation with respect to the light diffuser.

In another mode of assembly, the electrical display circuit constitutes a part of the container or the actuator. The electrical control circuit and the electrical display circuit can then be placed on a shared printed circuit board that constitutes a part of the container or the actuator.

A light source that is centered on the reference axis can also be used, with the diffuser constituting a part of the lid and having a light inlet facing the light source. Alternatively, the light source can be shifted with respect to the reference axis, with the diffuser being attached with respect to the lid so that it is fixed in the axial direction and free to rotate about the reference axis, the diffuser being equipped with an angular indexing relief for positioning the diffuser with respect to the light source.

In another mode of assembly, the diffuser is part of the lid.

The lubricator can also comprise a system for affixing the lid to the container without rotating the lid about the reference axis and with respect to the container. This system of attachment can comprise an intermediate attachment ring having a first intermediate thread working together with a thread on the lid and a second intermediate thread working together with a thread on the electromechanical actuator, with the first intermediate thread and the second intermediate thread having opposite thread directions.

In another alternative, the system for attachment comprises:
- an attachment ring equipped with an affixing interface with a bayonet or screw for affixing the ring to the electromechanical actuator by rotating the ring with respect to the electromechanical actuator and around the reference axis, and with a shoulder for pressing the lid onto the electromechanical actuator, and
- an angular relief for indexing the lid with respect to the electromechanical actuator.

In still another alternative, the affixing system comprises a toggle lever.

In one mode of assembly, the diffuser can be equipped with an angular relief for indexing with respect to the container, with an interface for affixing it with respect to the container and with an interface for affixing it with respect to the lid. It is also possible for the light diffuser to be equipped with an angular relief for indexing it with respect to the electromechanical actuator, with an interface for affixing it with respect to the electromechanical actuator and with an interface for affixing with respect to the lid.

In one mode of assembly, the electrical display circuit is powered by an autonomous electrochemical source, which constitutes a part of the lid and distinct from the power source of the actuator control circuit.

SHORT DESCRIPTION OF THE FIGURES

Figure 4:
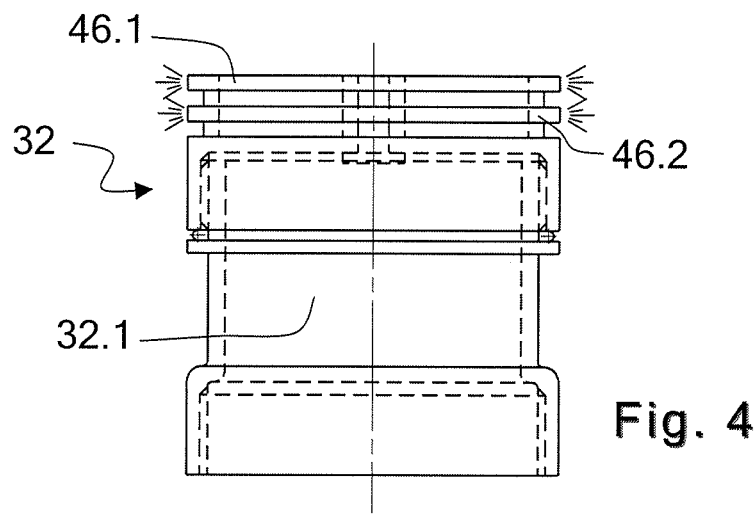
Figure 5:
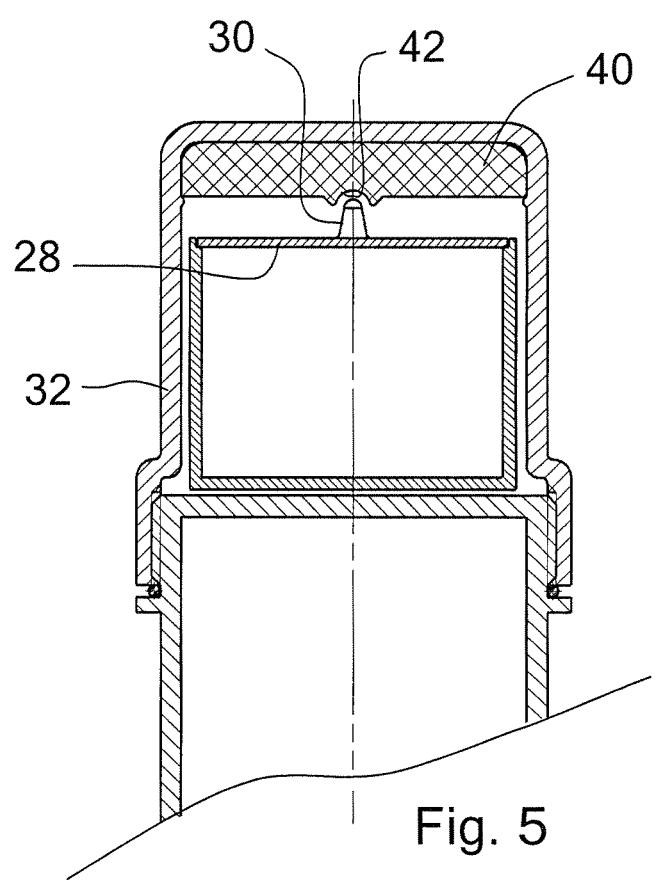
Figure 6:
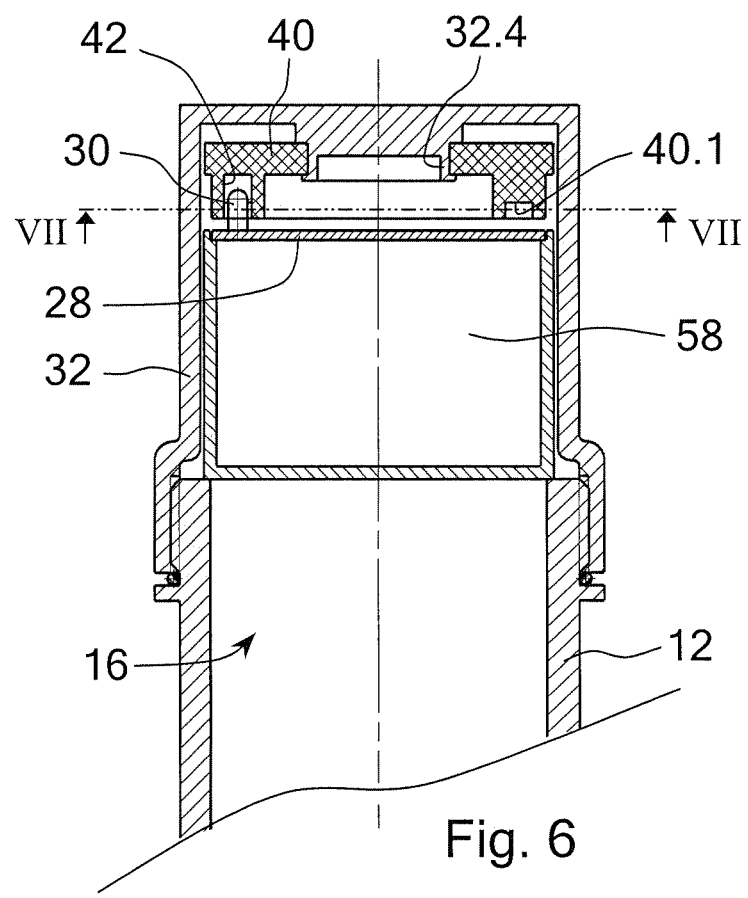
Figure 7:
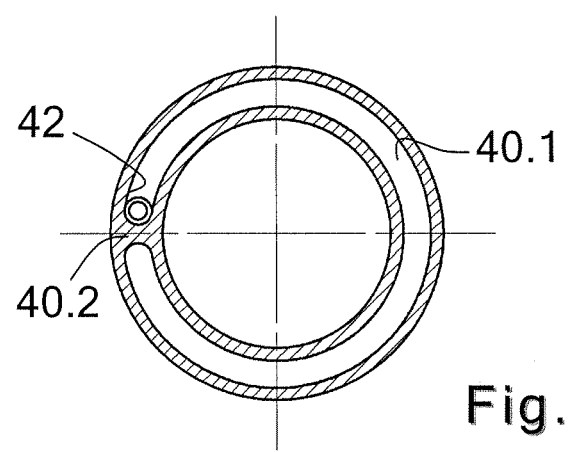
Figure 8:
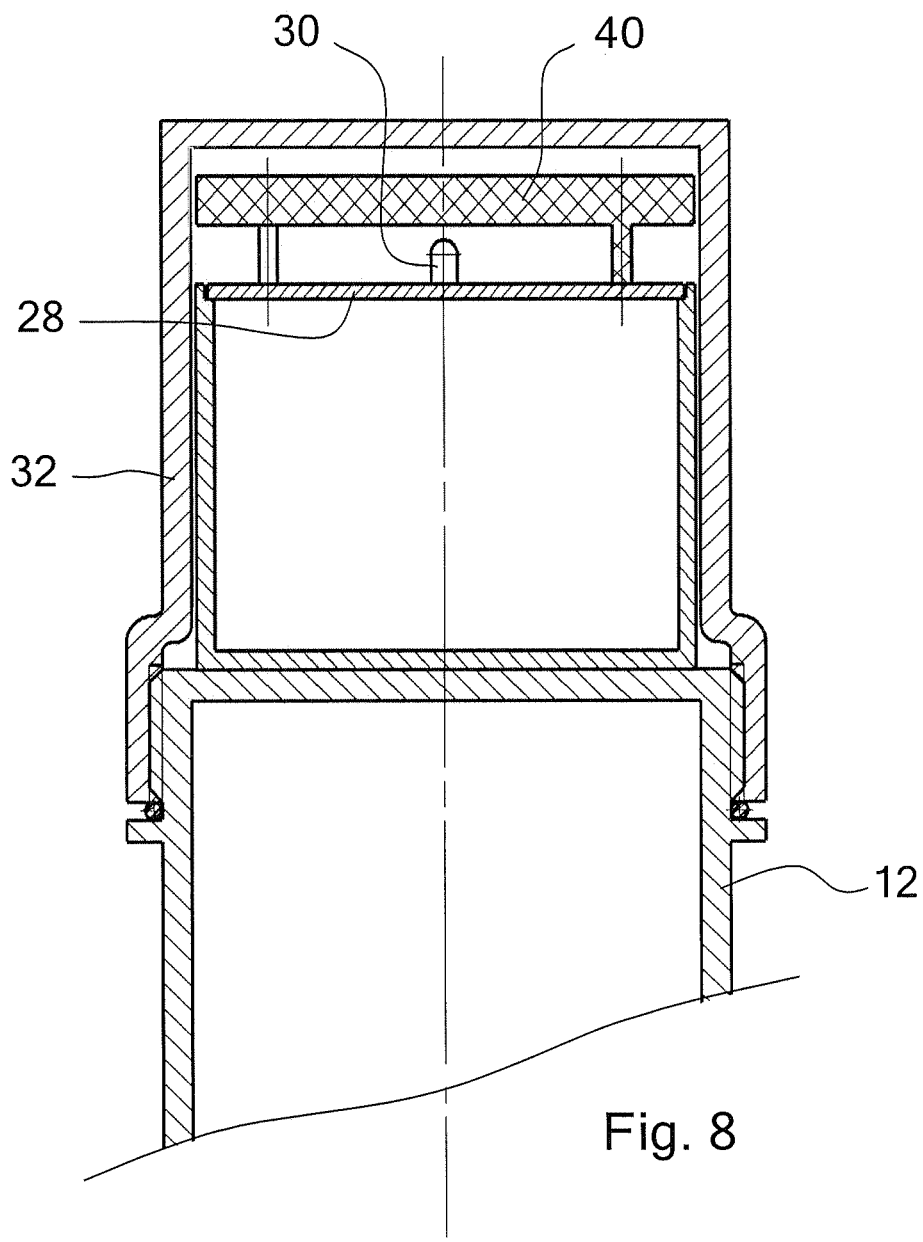
Figure 9:
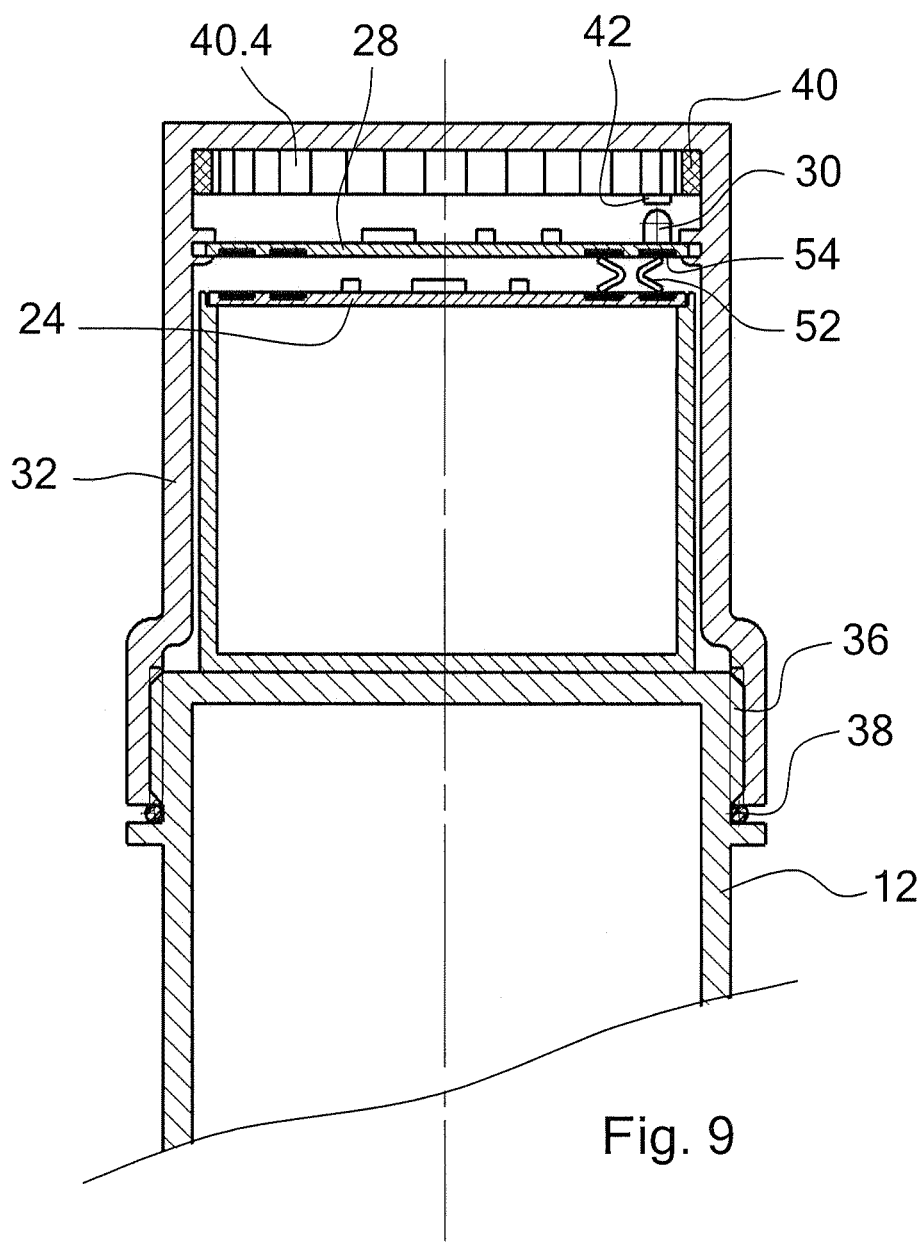
Figure 10:
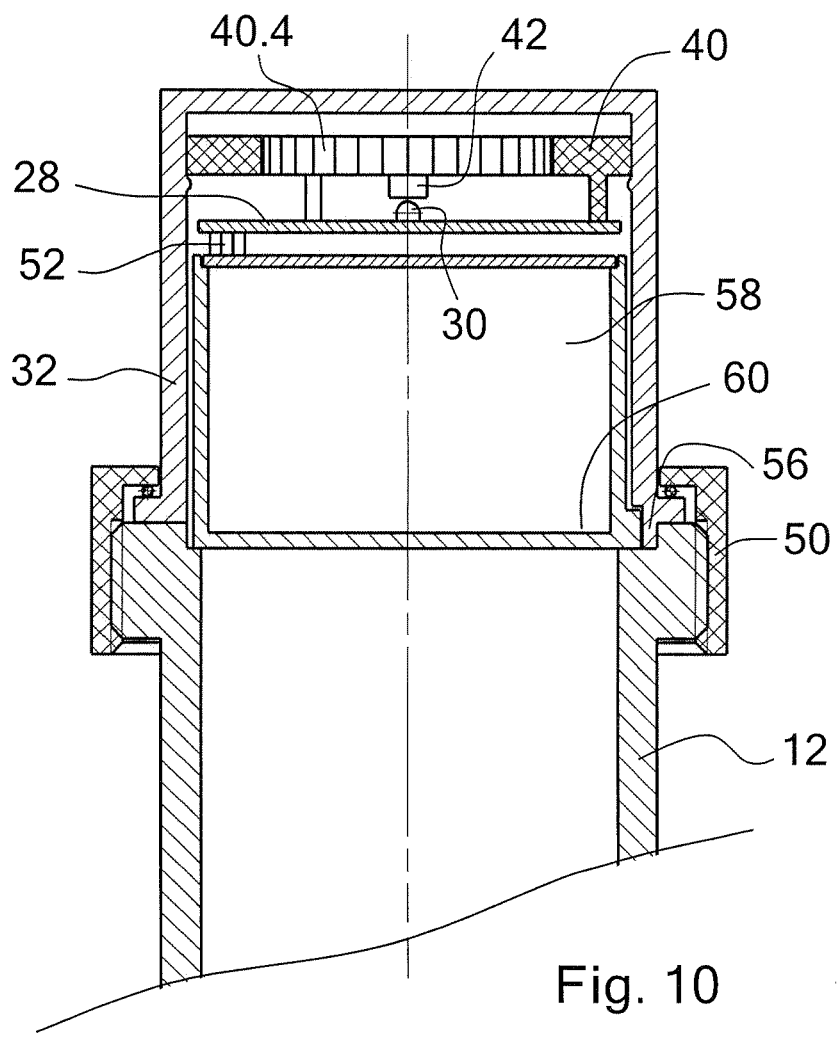
Figure 11:
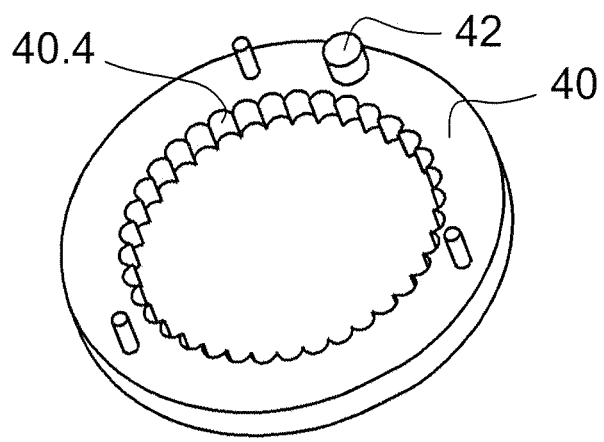
Figure 12:
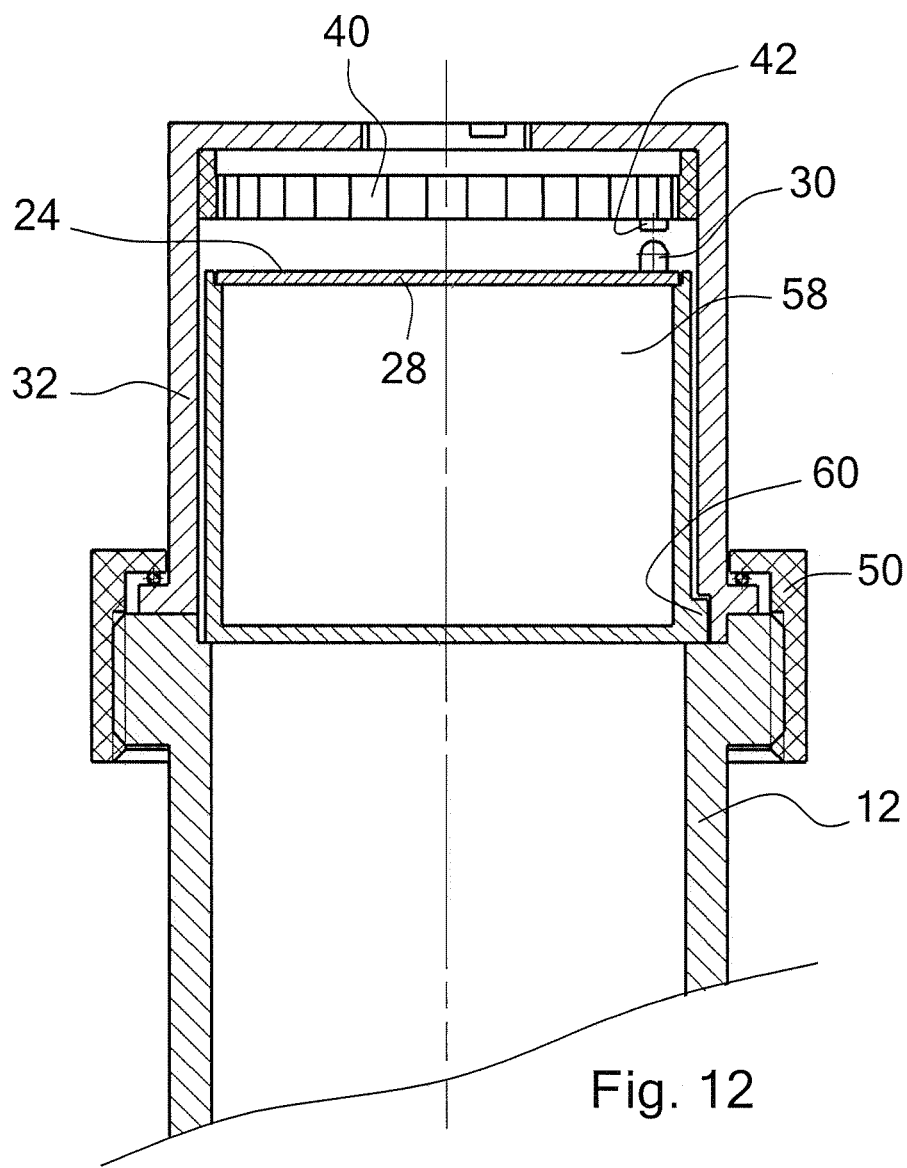
Figure 17:
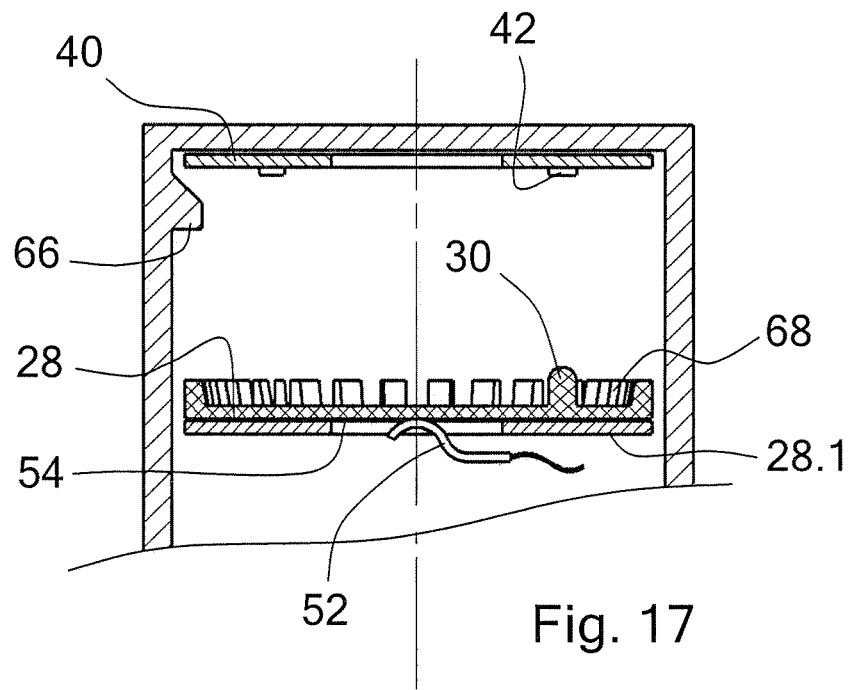
Figure 18:
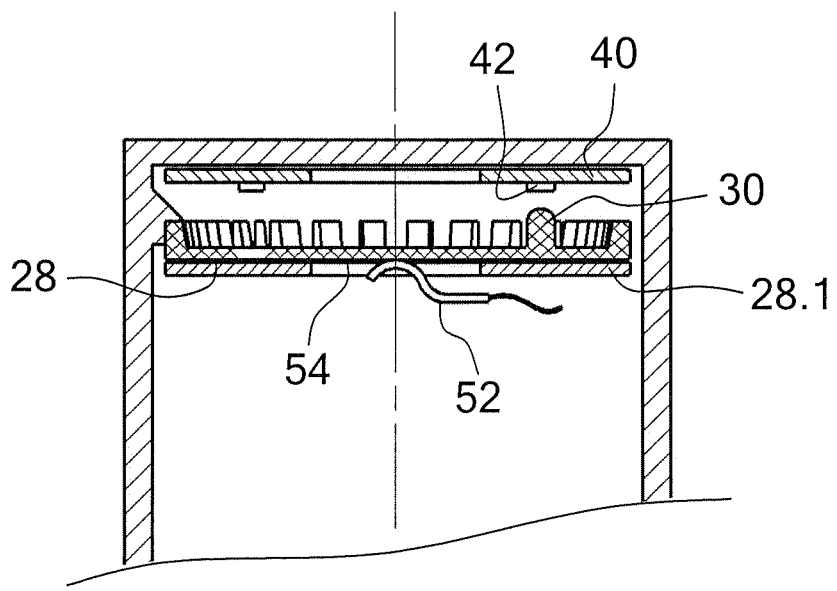
Figure 19:
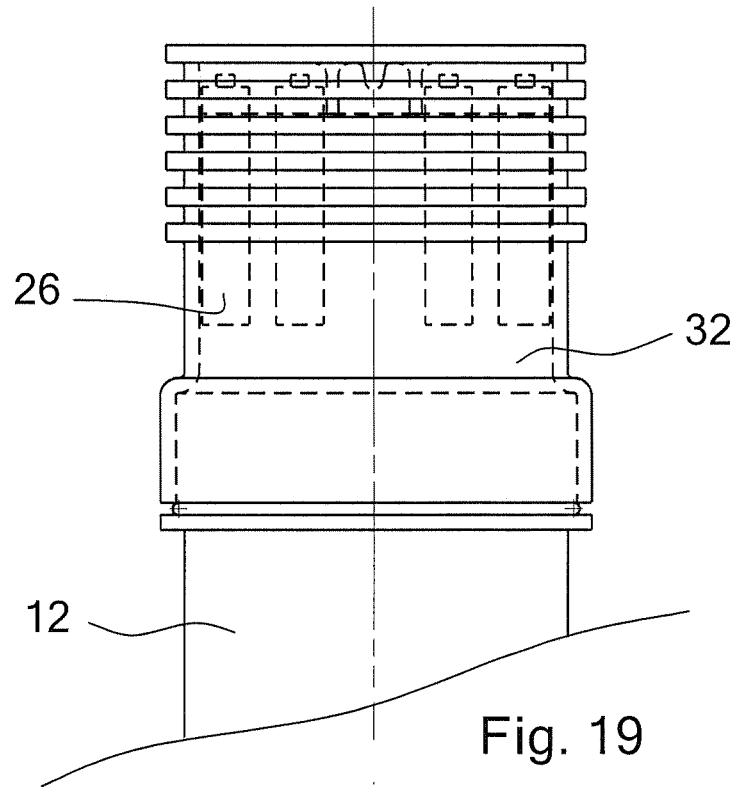
Figure 20:
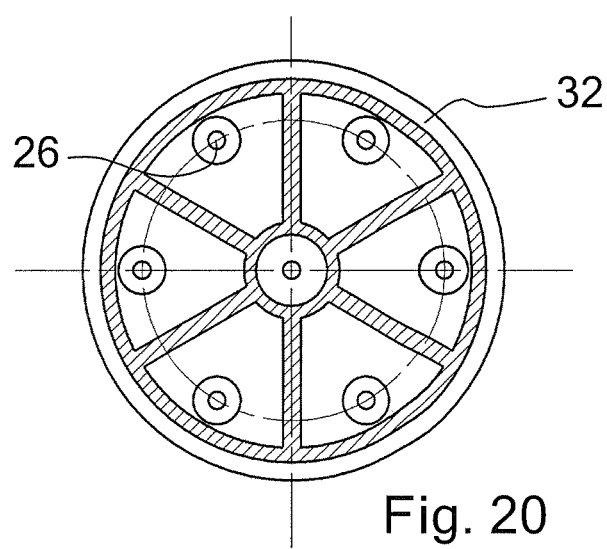
Figure 21:
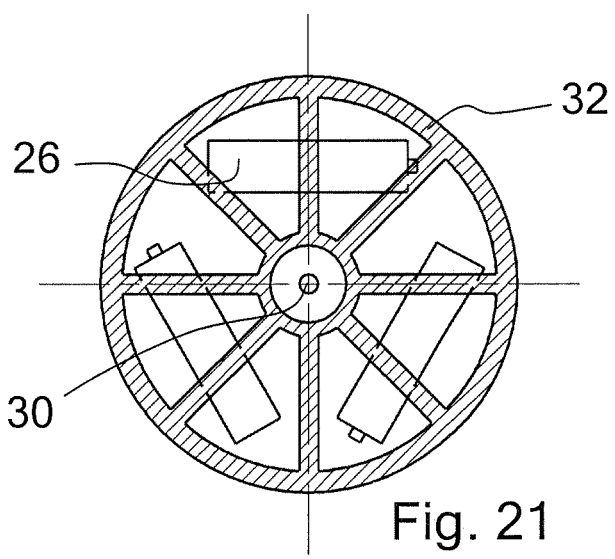
Figure 22:
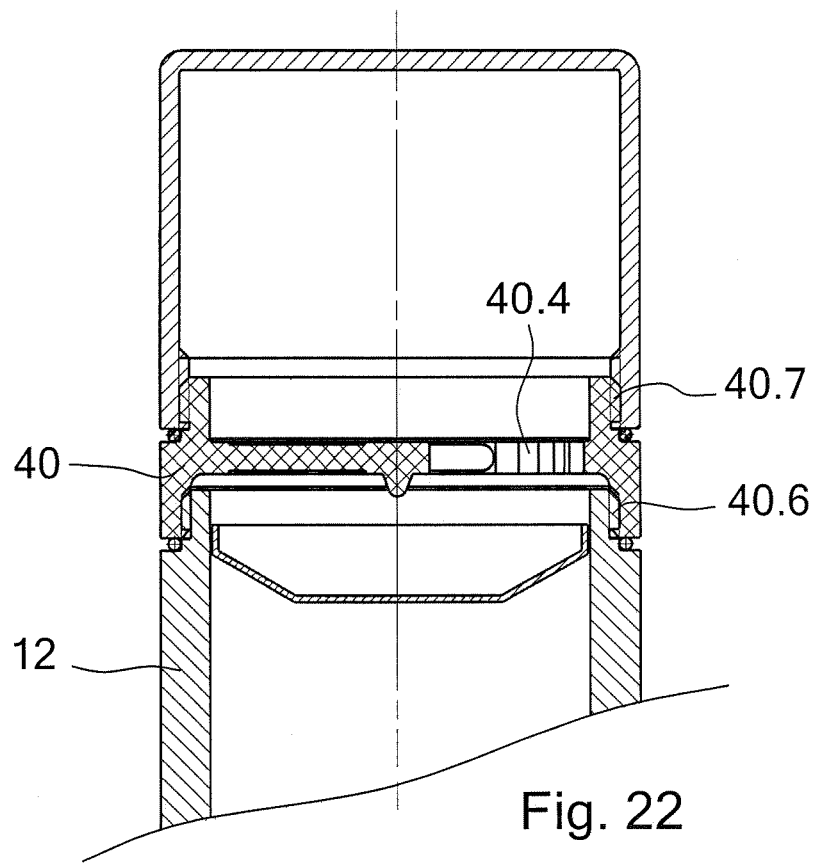
Figure 23:
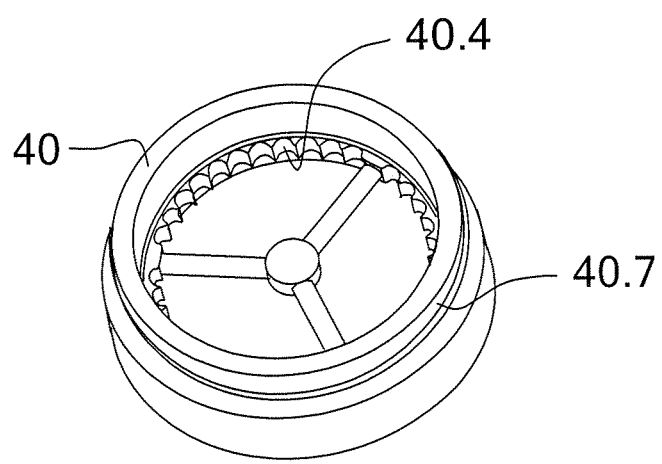
Figure 24:
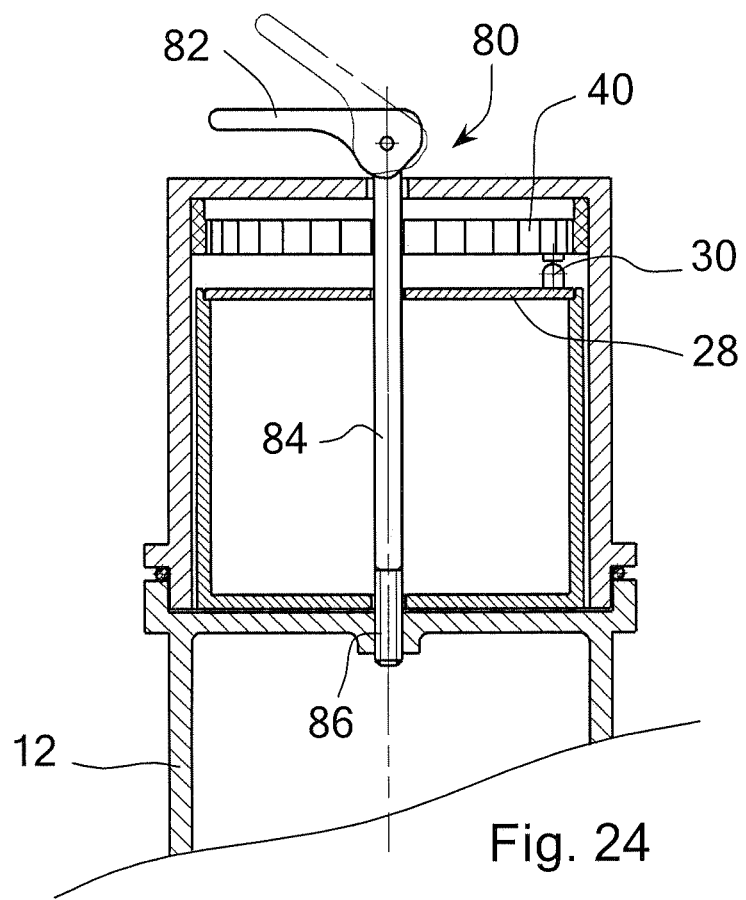
Figure 25:
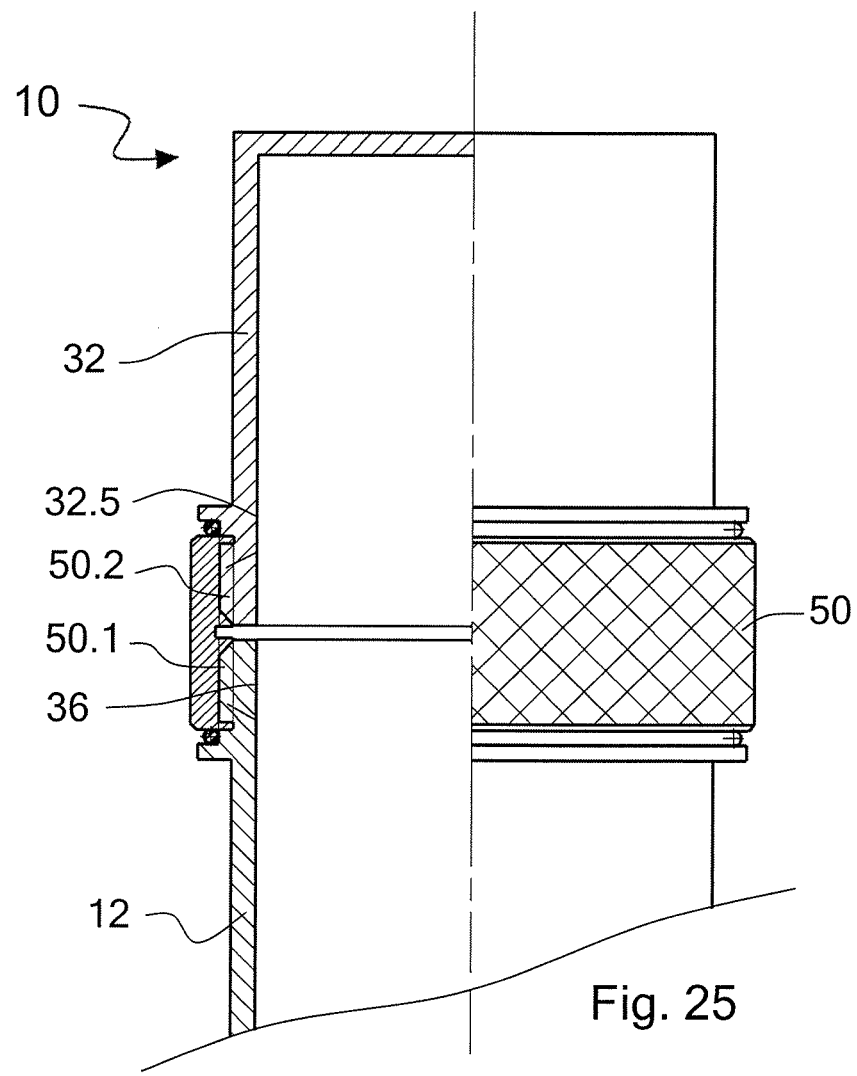

Other characteristics, details and advantages of the invention will derive from reading the subsequent description referring to the annexed figures, which show:

FIG. 1 a diagrammatic cross-sectional view of a lubricator in a first mode of assembly of the invention;

FIG. 2, a diagrammatic view along the line II-II of FIG. 1;

FIG. 3, a diagrammatic cross-sectional view of a lubricator in a second mode of assembly of the invention, FIG. 4, a side view of a lid of the lubricator of FIG. 3;

FIG. 5, a diagrammatic cross-sectional view of a lubricator in a third mode of assembly of the invention, FIG. 6, a diagrammatic cross-sectional view of a lubricator in a fourth mode of assembly of the invention, FIG. 7, a diagrammatic view along the plane VII-VII of FIG. 6, FIG. 8, a diagrammatic cross-sectional view of a lubricator in a fifth mode of assembly of the invention, FIG. 9, a diagrammatic cross-sectional view of a lubricator in a sixth mode of assembly of the invention, FIG. 10, a diagrammatic cross-sectional view of a lubricator in a seventh mode of assembly of the invention, FIG. 11, a diagrammatic perspective of a light diffuser of the lubricator of FIG. 10, FIG. 12, a diagrammatic cross-sectional view of a lubricator in an eighth mode of assembly of the invention, FIG. 13, a diagrammatic cross-sectional view of a lubricator in a ninth mode of assembly of the invention, FIG. 14, a side view of the lubricator in FIG. 13, FIG. 15, a diagrammatic cross-sectional view of a lubricator in a tenth mode of assembly of the invention, FIG. 16, a diagrammatic cross-sectional view of a lubricator in an eleventh mode of assembly of the invention, FIG. 17, a diagrammatic cross-sectional view of a lubricator in a twelfth mode of assembly of the invention in a position in the course of assembly, FIG. 18, a diagrammatic view of the lubricator of FIG. 17, upon completion of the assembly, FIG. 19, a diagrammatic cross-sectional view of a lubricator in a thirteenth mode of assembly of the invention, FIG. 20, a diagrammatic top view of the lubricator of FIG. 19, FIG. 21, a diagrammatic top view of a lubricator in a fourteenth mode of assembly of the invention, FIG. 22, a diagrammatic cross-sectional view of a lubricator in a fifteenth mode of assembly of the invention, FIG. 23, a diagrammatic perspective view of a light diffuser of the lubricator of FIG. 22, FIG. 24, a diagrammatic cross-sectional view of a lubricator in a sixteenth mode of assembly of the invention, FIG. 25, a diagrammatic cross-sectional view of a lubricator in a seventeenth mode of assembly of the invention.

For purposes of greater clarity, identical or similar components of the various modes of assembly will be labeled with identical reference signs in all of the figures. Their description will not be repeated systematically from one mode of assembly to another.

DETAILED DESCRIPTION OF A MODE OF ASSEMBLY

FIG. 1 shows a lubricator 10 in a first mode of assembly of the invention comprising a cylindrical housing 12 wherein a piston 14 moves so as to form a container with a variable volume 16, which is to contain a lubricant, the bottom of the container being equipped with at least one opening 18 for dispensing the lubricant. An electromechanical actuator 19 consisting of an electric motor 20 connected to an endless screw 22 is attached to an upper wall of the housing and makes it possible to actuate the piston 14 so as to reduce the volume 16 of the container and to deliver the lubricant. This kind of lubricator is in particular used to lubricate the moving parts of machines such as plain or roller bearings. The lubricator is attached to a housing of the machine by any suitable means of attachment, for example via an external thread 18.1 at the end of the opening 18 for dispensing the oil.

The electric motor is operated by an electrical control circuit 24 consisting of an integrated circuit board and powered by a source of electricity 26, preferably an on-board power source, for example an electrochemical source, such as a battery or a refillable accumulator.

The electrical control circuit 24 is connected to an electrical display circuit 28 comprising a light source 30, in practice a light emitting diode.

The electrical display circuit including the light source consists of a printed circuit board which holds the light emitting diode 30 and which, in this mode of assembly, is distinct from the printed circuit board of the control circuit 24.

The electrical display circuit 28 is located in a lid 32 having a generally cylindrical shape, with the interior volume 34 defined by the lid, which, in this mode of assembly, serves as a housing for the electrical control circuit 24, the on-board power source 26 and the electric motor 22. The lid is attached to the housing 12 in a removable manner in order to allow for access to the electrical display circuit 28 and, if necessary, to the electrical control circuit 24, the actuator 19 and/or the on-board power source 26. More precisely and in this mode of assembly, the lid 32 is screwed onto a peripheral thread 36 of the housing 12, with the interposition of a seal 38.

The lid is in the form of a cylindrical envelope with an axis A. Hereinafter for the rest of this description, this axis constitutes the reference axis of the lubricator.

In this mode of assembly, the lid 32 is made of transparent plastic. The light emitting diode 30 constituting the light source is centered on the reference axis A. The transparent lid 32 incorporates a light diffuser 40 for purposes of diffusing the light emitted by the light source towards an outlet on the circumference of the lid. This light diffuser 40 comprises a light inlet 42 positioned directly opposite to the light source 30, and spokes constituting radial light guides 44, eight in this example, in particular as shown in FIG. 2, so as to guide the light towards light outlets 46 located at the end of each radial guide 44 in such a manner that at least one of the light outlets is visible regardless of the position of an observer facing the lubricator and located on a circle of observation centered on the reference axis A of the lubricator.

If the light emitting diode 30 is centered on the reference axis A, it is not necessary to index the positioning of the light diffuser 40 with respect to the light emitting diode 30 when the lid 32 is opened or closed. This arrangement is thus perfectly suitable if nothing blocks the central positioning of the electroluminescent source.

A variant of the shape of the housing of lubricator 10 is illustrated in FIGS. 3 and 4 and shows a lid 32 comprising a lower opaque part 32.1 screwed onto a housing 12 and a transparent upper part containing the light diffuser 40 which has two peripheral rings 46.1, 46.2 on its outside wall, each of which has an infinity of light exits which diffuse the light uniformly over the circumference of the lid.

In another variant illustrated by FIG. 5, the light diffuser 32 is a part located on or in the lid 32, for example encased in the base of the lid 32, which makes it possible, if necessary to choose different materials for the light diffuser 40 on the one hand, which serves only an optical function, and for the lid 32 on the other hand, which must also have mechanical characteristics of rigidity and impact resistance.

In another alternative shown by FIGS. 6 and 7, the light diffuser 40 is held on a central block 32.4 that is formed on the bottom of the lid 32, but which preserves a degree of freedom of rotation, with considerable friction, around the reference axis A. This mode of assembly furthermore differs from the preceding ones in that the light source 30, which is mounted on the printed circuit board of the electrical display circuit 28, is part of the housing 12 of the lubricator and is not centered on the reference axis A of the lid. It is then necessary to provide a means for indexing the positioning of the light inlet 42 of the light diffuser 40 with respect the light source 30 during the assembly of the lid 32 to the housing 12. In this case, the light diffuser 40 has a groove in the form of a circular arc 40.1, with this arc preferably extending over an angle greater than 180° but certainly less than 360°, so as to define a radial wall 40.2 and forming a stop and a hollow housing constituting the light inlet 42, which is immediately adjacent to the wall 40.2. In an alternative, which is not shown, it is possible for the groove 40.1 to have an increasing depth from one of its ends to the other, so as to constitute a slope.

The lid 32 is attached to the housing 12 by screwing it on without angular indexing.

Upon assembly of the lid 32 to the housing 12, it suffices to position the lid 32 on the housing 12 by placing the light emitting diode 30 in the groove 40.1 and by centering the lid on the reference axis A, then rotating the lid 32 about the reference axis A until the diode 30 encounters the radial wall 40.2 forming an indexing stop. Proper positioning of the light emitting diode 30 with respect to the light inlet 42 is thus ensured. It is then possible to screw the affixing ring 50 onto the housing 12 so as to hold the lid 32. If one were to inadvertently try to turn the lid 32 while the light emitting diode 30 is already positioned against the stop of the indexing wall 40.2, the torque exerted on the light diffuser 40 would exceed the torque due to static friction between the light diffuser 40 and the center stud 32.4 of the lid 32 and would cause a rotation of the light diffuser 40 with respect to the lid 32 about the reference axis A, so that the diode 30 is not damaged.

In an alternative, which is not shown, a mechanical stop forming part of the printed display circuit is used to perform the angular indexing rather than the light emitting diode, which is a potentially fragile element.

FIG. 8 shows another mode of assembly of the invention, which particularly differs from the preceding ones in that the light diffuser 40 is part of the printed display circuit board 28, so that its positioning with respect to the light emitting diode 30 is ensured at the time of a preliminary assembly step, preceding the assembly of the lid 32 to the housing 12. The light emitting diode 30 can either be centered or not.

In another mode of assembly, shown in FIG. 9, a light source 30 is integrated into the transparent lid 32. More specifically, the printed signal display circuit 28, incorporating a light emitting diode 30 that is shifted with respect to the reference axis A, is incorporated into the lid 32.

An annular light diffuser 40 is placed in the bottom of the lid 32. This light diffuser 40 comprises a light inlet 42 positioned directly opposite the light source 30, and a multitude of facets 40.4 that are distributed over the interior periphery of the ring and are oriented so as to constitute mirrors that redirect the light radially towards the exterior. The positioning of the light inlet 42 of the light diffuser 40 with respect to the light source 30 is established during a preliminary step for assembling the light diffuser 40 to the lid 32 followed by the printed circuit 28 bearing the light emitting diode 30. To achieve this, one can provide a means for direct angular indexing of the light diffuser 40 and the printed circuit board 28 with respect to each other or for indirect indexing with respect to the lid 32.

The lid 32 is assembled to the housing 12 by screwing it on, so that the angular positioning of the lid 32 with respect to the housing 12 is not defined with certainty. It is thus possible to provide an elastically deformable contact blade 52 which slides over an annular contact strip 54 that is connected electrically so as to connect the printed display circuit 28 to the electrical control circuit 24 and to the power supply.

In an alternative that is not shown, it is also possible to transmit the electric power by induction, i.e. without contact between the electrical display circuit and the electrical control circuit.

In another mode of assembly shown by FIGS. 10 and 11, the light diffuser 40 and the electrical display circuit 28 are attached to the lid. As in the preceding mode of assembly, this light diffuser 40 of annular shape comprises a light inlet 42 located directly opposite the light source 30, and a multitude of facets 40.4 that are distributed over the interior periphery of the ring and are oriented so as to constitute mirrors that redirect the light radially towards the exterior. The positioning of the light inlet 42 of the light diffuser with respect to the light source 30 is determined in a pre-assembly stage of the light diffuser 40, then of the printed circuit bearing the light emitting diode 30 in the lid 32.

The lid 32 is then affixed indirectly to the housing 12 of the lubricator, i.e. by means of a tightening ring 50, which is screwed onto the housing 12. Thus no rotational displacement of the lid 32 is required during the assembly of the lid 32 to the housing 12. One can thus provide indexing reliefs 56 at angular positions of the lid with respect to the housing. The electrical control circuit 24 is in turn positioned in an interior cover 58 of the housing of the actuator and of the power source, with this cover also having an indexing relief at an angular position 60 with respect to the housing and/or with the lid. The electrical control circuit 24 can thus be connected electrically to the electrical display circuit 28 via two elastic legs 52 or any other means for making an axial connection.

FIG. 12 shows an alternative also employing a ring 50 that is screwed onto the housing 12 and that holds the lid 32. In this alternative, the electrical control circuit 24 and the electrical display circuit 28 are integrated on the same support plate in an upper part of a cap 58 that covers the actuator. This cap 58 is equipped with an indexing relief 60 facing the lid 32 and/or the housing 12. The light diffuser 40 is in turn affixed to or integrated into the lid. During assembly, the lid 32 immediately assumes its operating position thanks to the indexing reliefs 60, 56, with the tightening being accomplished by means of the tightening ring 50 without an angular displacement of the parts with respect to each other. The correct positioning of the light inlet 42 of the light diffuser 40 with respect to the light source 30 supported by the support plate is thus ensured.

FIGS. 13 and 14 show another alternative, which, like the preceding mode of assembly, has a single support plate that integrates the electrical control circuit 24, the electrical display circuit 28 and its light source 30. The plate is located in the upper part of a cap 58 covering the actuator 19. This cap 58 is equipped with an indexing relief 60 facing the housing 12. The light diffuser 40 is in turn affixed to or integrated into the lid 32. In this alternative, the lid 32 is screwed onto an external thread 36 of the housing 12. To ensure the correct positioning of the light source 30 with respect to the light inlet 42 of the light diffuser 40 and proper locking in this position, the lid 32 is equipped with a pin 62 at the end of an elastic blade 64. When the lid 32 reaches the desired position, the pin 62 penetrates a recess 66 in the housing 12 and locks the lid 32 in position with respect to the housing 12. It is possible to disengage it by elastically deforming the blade 64 by means of a tool.

FIG. 15 shows another mode of assembly characterized by integrating the light source 30 and the electrical display circuit 28 on the lid 32. The light source 30 can be positioned in the center or it can be offset, and the light diffuser 40 can have any arbitrary shape. The lid 32 is screwed directly onto the housing 12 and combines two electrical conductors so as to connect the light source 30 to two elastic radial contacts 52 which come into contact with two annular electrical pathways 54 on the circumference of an interposed bonnet 58 covering the electrical control circuit and the electromechanical actuator. Electrical contact can thus be assured independently of the angular positioning of the lid 32 after it is screwed in place. The light source 30 and the electrical signal display circuit 28 consisting of the electrical conductors can be molded into the lid 32.

In an alternative shown in FIG. 16, the supply of power to and control of the light source can be achieved via elastic contacts 52 that are axially pressed against two concentric annular strips 54.

In another mode of assembly, shown by FIGS. 17 and 18, the electrical display circuit 28 which carries the light emitting diode 30 constituting the light source is mounted onto the plate 28.1 that is free to rotate with respect to the electrical control circuit 24. The lid 32 incorporates the light diffuser 40, whose light inlet 42 must be positioned with respect to the light source 30 during a preliminary assembly step. To accomplish this, indexing reliefs 66, 68 are placed between the support plate of the electrical display circuit and the lid. The indexing reliefs preferably consist of an index 66 operating in tandem with a toothed wheel. Upon assembly, the operator selects that position of the plate 28.1 which best aligns light source 30 with the light 42 inlet and affixes the plate 28.1 to the lid 32. The plate 28.1 is equipped with two concentric annular contact strips 54, which are pressed against two elastic blades 52 so as to establish an electrical connection between the electrical display circuit 28 and the electrical control circuit 24.

In another mode of assembly shown by FIGS. 19 and 20, the power supply 26 for the electrical display circuit 28 is integrated with the lid 32. It is implied here that, as in the modes of assembly of FIGS. 15 and 16, the light source 30 is also in a fixed position with respect to the lid 32. The electrical power source 26 of the electrical display circuit can in particular consist of batteries or cylindrical accumulators positioned parallel to the reference axis, as shown in FIGS. 19 and 20, or positioned according to an alternative shown in FIG. 21. They can also be button batteries.

If the power source of the display circuit is separate from the power source for the control circuit, it is advantageous to have no wired connection between the electrical control circuit of the electromechanical actuator and the electrical display circuit. The transmission of commands from the electrical control circuit of to the electrical display circuit can be achieved by a wireless transmission method, for example via radio frequency transmission, induction or an optical signal.

The modes of assembly of FIGS. 19 to 21 make it possible to combine the display function in an autonomous subassembly that is integrated with the lid.

In another mode of assembly illustrated by FIGS. 22 and 23, the light diffuser 40 consists of a ring with two wires 40.6, 40.7, positioned between the lid 32 and the housing 12. The light diffuser 40 is screwed onto the housing, with the interposition of a seal if necessary, with the lid in turn being screwed onto the light diffuser, also with the interposition of a seal. It is thus possible to screw on and unscrew the lid without the risk of altering the position of the light diffuser 40. The lid can furthermore be opaque, since it no longer has any optical function. The energy source and the actuator (not shown) are then placed in the lid. The actuator is preferably of an electrochemical type and the sealed housing defined by the lid is in direct communication with the piston 14. The activation of the electrochemical actuator applies pressure which actuates the piston in the housing.

In another mode of assembly, illustrated in FIG. 24, the motion of screwing the lid 32 to the housing 12 can be dispensed with by providing a locking device 80 consisting of a lever with a cam 82 that is articulated at the end of a shaft 84 that is attached to the housing 12 in an immovable manner and crosses the bottom of the lid 32. To assemble the lid 32, the latter is placed in the desired position with respect to the housing 12 and the rod 84 of the clamping mechanism 80 is then pushed through the lid 32 so as to screw it into a threaded hole 86 that is part of the housing 12, before the lever with the cam is activated so as to tighten the lid 32 against the housing 12.

In the mode of assembly in FIG. 25, a fixing ring 50 with two opposite threads 50.1, 50.2 is made to work with the thread 36 of the housing 12 of lubricator 10 on the one hand, and with the thread 32.5 of the lid on the other hand. An indexing guide is additionally placed between the lid and the housing to prevent rotation of the lid with respect to the housing. For purposes of assembly, the ring is placed between the lid and the housing, the slide is engaged with the keyway of the guide and the ring is then turned so that the threads are used to simultaneously screw the three parts to each other.

In all of the modes of assembly that are presented, the display circuit can be activated so as to emit a specific light signal when the lid reaches its final position during assembly.

This can for example be a short sequence of flashes, which attests to the progress of a sequence of tests initiated by the control circuit.

Other alternatives can be considered. The light source that is integrated into the electrical display circuit can use any means of light emission derived from an electrical source. The reference axis A of the lid 32, which in practice corresponds to an axis for the assembly of the lid (for example by screwing) to the housing 12, can be separate from the axis of motion of the piston 14.

The actuator can be an electric motor or an electrochemical actuator emitting a gas under pressure causing the piston to move. The piston itself can be rigid or it can consist of an inflatable sac.

The lid can be completely transparent or it can have individual light outlets that are distributed over its circumference.

The electrical control and display circuits can be free of support by rigid printed circuit boards.

The invention claimed is:

1. A lubricator comprising:
    a container of variable volume for holding a lubricant, with the container being equipped with at least one opening for dispensing the lubricant;
    an electromechanical or electrochemical actuator to reduce the volume of the container;
    an electrical control circuit for the actuator;
    an electrical circuit for displaying the state of the lubricator, comprising a light source so as to emit at least one alarm light signal,
    a lid attached to the container in a removable manner in order to constitute a housing for the electrical display circuit, and
    a light guide to guide the light emitted by the light source towards numerous light outlets distributed on the circumference of the lid in such a manner that at least one of the light outlets is visible to an observer facing the lubricator and located orthogonal to a reference axis passing through the center of the lid and the center of the light source of the lubricator.

2. The lubricator according to claim 1, wherein the light guide comprises a light inlet positioned opposite the light source and at least one light distributor to distribute the light towards the light outlets.

3. The lubricator according to claim 2, wherein the light distributor imposes a trajectory on the light, a part of which is a circular arc around the reference axis.

4. The lubricator according to claim 3, wherein the light distributor imposes a trajectory on the light that is partially radial with respect to the reference axis.

5. The lubricator according to claim 2, wherein the light distributor imposes a trajectory on the light, a part of which is oriented orthogonal to the reference axis.

6. The lubricator according to claim 1, wherein the lid is screwed to the container along the reference axis.

7. The lubricator according to claim 1, wherein the light guide is located inside the lid, with the lid being transparent, at least at the level of the light outlets.

8. The lubricator according to claim 1, wherein the electrical control circuit comprises a printed control circuit board, the electrical display circuit comprises a printed display circuit board that is distinct from the printed control circuit board, which is electrically connected to the printed control circuit board via at least one electrical connection interface comprising an electrical contact connected to the electrical display circuit and a corresponding electrical connector connected to the electrical control circuit.

9. The lubricator according to claim 8, wherein at least one of the electrical connectors comprises a contact strip forming a circular arc around the reference axis.

10. The lubricator according to claim 9, wherein at least one of the connectors is elastically deformable.

11. The lubricator according to claim 8, wherein at least one of the connectors is elastically deformable.

12. The lubricator according to claim 8, wherein the electrical display circuit is attached to the lid.

13. The lubricator according to claim 8, wherein the electrical display circuit is assembled on a plate that is located in the lid and is indexed by rotation with respect to the light guide.

14. The lubricator according to claim 1, wherein the electrical display circuit constitutes a part of the electromechanical actuator.

15. The lubricator according to claim 14, wherein the electrical control circuit and the electrical display circuit are located on a shared printed circuit board, which constitutes a part of the electromechanical actuator.

16. The lubricator according to claim 14, wherein the light guide forms a part of the lid and has a light inlet facing the light source such that the light source is centered on the reference axis.

17. The lubricator according to claim 14, wherein, such that the light source is shifted with respect to the reference axis, while the light guide is in a position with respect to the lid that is fixed with respect to axial translation and free to rotate around the reference axis, with the light guide being equipped with an angular indexing relief so as to position the guide with respect to the light source.

18. The lubricator according to claim 1, wherein the light guide is an integral part of the lid.

19. The lubricator according to claim 18, wherein the lubricator further comprises a device for affixing the lid to the container, without rotating the lid with respect to the container around the reference axis.

20. The lubricator according to claim 19, wherein the affixing device comprises an intermediate attachment ring, having a first intermediate thread that works with a thread on the lid and a second intermediate thread that works with a thread on the electromechanical actuator, with the first intermediate thread and the second intermediate having threads operating in opposite directions.

21. The lubricator according to claim 19, wherein the affixing device comprises:
    a ring equipped with a bayonet or a screw for affixing the ring to the electromechanical actuator by rotation of the ring with respect to the electromechanical actuator around the reference axis, and with a shoulder pressing the lid onto the electromechanical actuator, and
    a relief for angular indexing of the lid with respect to the electromechanical actuator.

22. The lubricator according to claim 19, wherein the affixing device comprises a lever with a cam.

23. The lubricator according to claim 1, wherein the light guide is provided with a relief for angular indexing with respect to the electromechanical actuator, the light is provided with an interface for affixing it to the electromechanical actuator, and with an interface for affixing it to the lid.

24. The lubricator according to claim 1, wherein the electrical display circuit is powered electrically by an autonomous electrochemical source which constitutes a part of the lid.

* * * * *